M. G. IMBACH.
Calipers.

No. 71,178.

Patented Nov. 19, 1867.

Witnesses:
Theo Fuske
Wm Trewin

Inventor:
M. G. Imbach
Per Munn & Co.
Attorneys

United States Patent Office.

M. G. IMBACH, OF HARTFORD, CONNECTICUT.

Letters Patent No. 71,178, dated November 19, 1867.

IMPROVEMENT IN CALIPERS OR DIVIDERS.

*The Schedule referred to in these Letters Patent and making part of the same.*

TO ALL WHOM IT MAY CONCERN:

Be it known that I, M. G. IMBACH, of Hartford, in the county of Hartford, and State of Connecticut, have invented a new and useful Improvement in Calipers or Dividers; and I do hereby declare that the following is a full, clear, and exact description thereof, which will enable others skilled in the art to make and use the same, reference being had to the accompanying drawings, forming part of this specification.

The present invention relates to calipers, dividers, and other similar instruments, the object of the improvement being to enable the adjustment of the instrument to be produced with great quickness, combined with accuracy. In the accompanying plate of drawings my improvement in calipers is illustrated—

Figure 1:
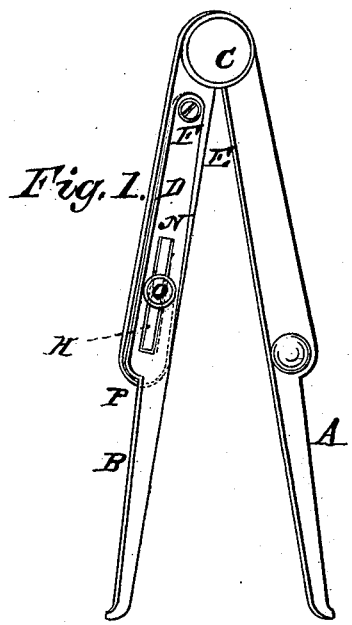
Figure 2:
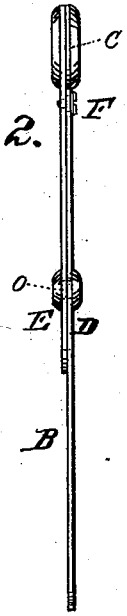
Figure 3:
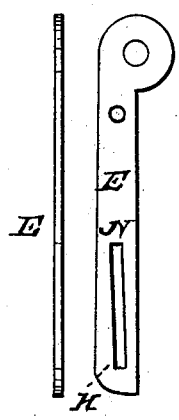
Figure 4:
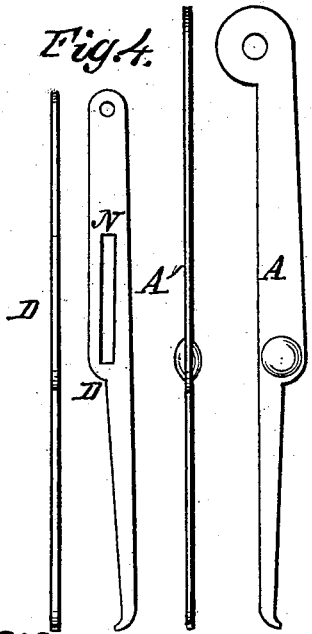
Figures 5, 6, 7:
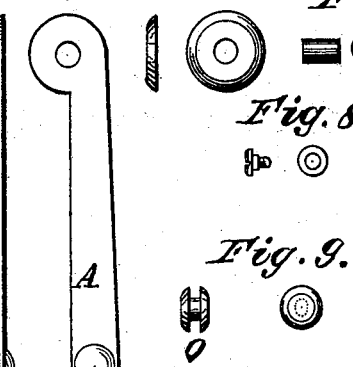
Figure 8:
Figure 9:

Figure 1 being a side view of the same,

Figure 2 an edge view, and

Figures 3, 4, 5, 6, 7, 8, and 9, detail views of the separate parts composing the calipers.

Similar letters of reference indicate corresponding parts.

A and B, in the drawings, represent the two legs of the instrument, pivoted together at C, as in the ordinary calipers, &c. The leg B is formed of two parts, D and E, the one, D, being pivoted to the other at F, and lying thereon projects and forms the leg similar to the leg A. These parts, D and E, at H are both slotted in the direction of their length, which slots, at their ends N, are in the middle of the parts D and E, but from such points they extend in different directions, as plainly shown in fig. 1, in the one case, by dotted lines. In these slots the shank O is arranged to move, which shank at each end is headed to prevent its detachment from the instrument, at the same time holding the two parts together. By sliding or moving the shank O up or down in the slots of the parts D and E, such parts are made thereby to move in different directions at the point P.

In using the calipers constructed as above described, first set the shank O at or near the centre of the slots; then open or shut the calipers, as ordinarily, to within a trifle of the size desired, when, by moving the shank O either toward or from the pivot F, the part D will adjust itself to the desired size with the greatest accuracy.

I claim as new, and desire to secure by Letters Patent—

The fixed pivot F and movable shank O, extending through the parts D E, forming one leg of the calipers, when operating as described for the purpose specified.

M. G. IMBACH.

Witnesses:
G. C. BARNES,
ALBERT L. BURKE.